United States Patent Office 3,399,952
Patented Sept. 3, 1968

3,399,952
METALLIZED POLYOLEFIN DYEING WITH 1,4-DI-HYDROXY- OR 1,4,5,8-TETRAHYDROXY-HALO-GENATED ANTHRAQUINONES SUBSTITUTED IN THE 2-POSITION BY PHENOXY, ALKYLIMI-NO, ANILINO AND N-ALKYLANILINO GROUPS
Yutaka Hosoda, Tokyo, Japan, assignor to Mitsui Kagaku Kogyo Kabushiki Kaisha (Mitsui Chemical Industry Co., Ltd.), Tokyo, Japan
No Drawing. Filed Feb. 21, 1966, Ser. No. 528,778
Claims priority, application Japan, Feb. 26, 1965, 40/11,148
19 Claims. (Cl. 8—31)

ABSTRACT OF THE DISCLOSURE

This invention concerns a process for dyeing metal-modified dyeable polyolefin fibers which comprises contacting said fibers with an aqueous dispersion of an anthraquinone dye having the following formula

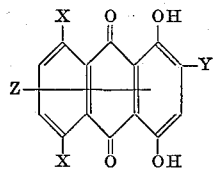

wherein X is a member selected from the class consisting of hydrogen and a hydroxyl group, Y is a member selected from the class consisting of OR, NHR and

R is a member selected from the class consisting of alkyl groups of 1 to 12 carbon atoms and phenyl group, which phenyl group may be substituted by a member selected from the class consisting of halogens and alkyl groups of 1 to 9 carbon atoms, R' is an alkyl group of 1 to 4 carbon atoms and Z is a member selected from the group consisting of hydrogen and halogens, but Z being limited to only the halogens when Y is a member selected from the class consisting of alkoxy groups of 1 to 6 carbon atoms, alkyl amino groups, phenoxy group and phenoxy groups which are substituted by a methyl or ethyl group in the meta or para position.

---

This invention relates to new disperse dyestuffs of the anthraquinone series and a process for dyeing polyolefin fibers using the same. More specifically, this invention relates to dyestuffs of the anthraquinone series which dye metal-modified polypropylene fibers to brilliant and fast colors of red, purple and blue.

In order to improve the dyeing of polyolefin fibers which do not have in the first place anchor sites which are receptive of dyestuffs, a process has been developed recently in which fibers spun from particularly polypropylene in which has been incorporated a salt of a metal such as nickel, aluminum or zinc is dyed with colorfastness by means of dyestuffs which are chelatable with metals. To be sure, this is a valuable process, but it is not necessarily true that all combinations of the specific dyestuffs and metals that are used give serviceably satisfactory dyeing results. For instance, a certain class of chelatable dyestuff will dye nickel-modified polypropylene fibers with satisfactory affinity and colorfastness but will not necessarily dye an aluminum-modified fiber satisfactorily. Hence, there are few dyestuffs that will give dyeings having serviceable saturation and brilliance as well as fastness to light, gas, sublimation and drycleaning, regardless of the class of metal that is incorporated.

An object of the present invention it to provide new dyestuffs.

Another object of this invention is to provide certain dyestuffs which will impart serviceably satisfactory dyeings uniformly to metal-modified polyolefin fibers, above all, the nickel, aluminum or zinc-modified polypropylene fibers.

A further object of this invention is to provide a process for dyeing by which the nickel, aluminum, or zinc-modified polypropylene fibers can be imparted colorfast dyeings.

Generally speaking, the anthraquinone dye compounds provided by this invention are characterized in that they have a structure wherein the hydroxyl groups in α-positions (the hydroxyl groups in α-positions being chelatable with metals) number two or four (in 1,4-positions and/or 5,8-positions) and a β-position vicinal to one of said hydroxyl groups is substituted by an alkoxy, phenoxy, alkylimino or phenylimino group (these groups having the ability of enhancing the affinity of dyestuffs for polyolefins). More specifically, the dye compounds of this invention have the formula (I)

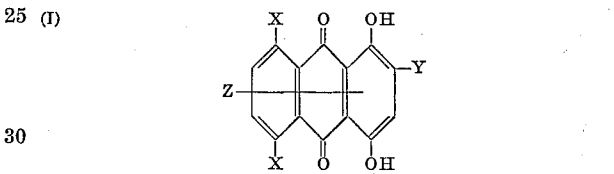

wherein X represents either hydrogen or a hydroxyl group, Y represents OR, NHR or

in which R represents an alkyl group of 1–12 carbon atoms or phenyl group, which phenyl group may be substituted by halogens or an alkyl group of 1–9 carbon atoms, R' represents an alkyl group of 1–4 carbon atoms, and Z represents hydrogen or halogen, but when Y is an alkoxy group of 1–6 carbon atoms, alkyl amino groups, phenoxy group or p-methyl-, m-methyl-, p-ethyl- or m-ethyl-phenoxy group, Z is limited to only the halogens. Accordingly, when Y in the formula is OR and R is either an alkyl group of 7–12 carbon atoms or a phenyl group substituted by an alkyl group of 3–9 carbon atoms, Z may be either hydrogen or halogen. Of the dye compounds which are comprehended in the Formula I, particularly desirable for attainment of the objects of this invention include 2-o-methylphenoxy-quinizarin, 2-m-methyl-anilino-quinizarin, 2-phenoxy-β-chloro (or bromo)-1,4,5,8-tetrahydroxy-anthraquinone, 2-β-ethylhexyloxy-quinizarin, 2-p-isohexylphenoxy-quinizarin, 2-isohexyloxy-quinizarin, 2-o-chloroanilino-quinizarin, 2-p-isopropylanilino-quinizarin, 2-anilino-β-chloro (or bromo)-1,4,5,8-tetrahydroxyanthraquinone, 2-p-tert.-butyl-phenoxy-β-chloro (or bromo)-quinizarin, 2-N-n-butyl-anilino-1,4,5,8-tetrahydroxyanthraquinone, 2-anilino-1,4,5,8-tetrahydroxyanthraquinone, etc. Of these, the dye compounds which are suitable above all are the four compounds 2-o-methylphenoxy-quinizarin, 2-m-methyl-anilino - quinizarin, 2 - phenoxy - 6 - chloro - 1,4,5,8-tetrahydroxyanthraquinone and 2-phenoxy-6-bromo-1,4,5,8-tetrahydroxyanthraquinone.

Of the dye compounds of Formula I, the dye compounds having two X's which are hydrogen, i.e., the dye compounds regarded as being the derivatives of quinizarin, impart a hue of the red-purple series to the metal-modified polyolefin fibers. On the other hand, the compounds in which the two X's are hydroxyl groups, i.e., the dye compounds regarded as being the derivatives of tetrahydroxyanthraquinone, impart a hue of the blue series to the metal-modified polyolefin fibers.

When a halogen atom, particularly chlorine or bromine, is introduced into the β-position of the anthraquinone nucleus of the invention dyestuff compound, the brilliance and intensity of its hue is enhanced. Hence, it is recommended in this invention that a hydrogen in at least one of the positions 3, 6 and 7, preferably the hydrogen in the 6-position, of the anthraquinone nucleus of the Formula I be replaced by these halogen atoms. The effect of the introduction of halogen is especially marked in the case of the blue series dyestuffs of this invention.

The invention dyestuffs are prepared very readily by a process which in itself is known. Thus, the dyestuffs are prepared, for example, by heating and condensing at a suitable temperature ranging between 120° and 180° C., an anthraquinone intermediate having a halogen atom such as chlorine or bromine as a substituent for the substituent Y in the Formula I along with a hydroxy compound or an amino compound of the formula HY (i.e. HOR, $NH_2R$ or $NHR'C_6H_5$ where R and R' have the meanings defined in Formula I, in the presence, if necessary, of an acid-binding agent such, for example, as a caustic alkali or an alkali carbonate and a catalyst such, for example, as copper powder. In using a polyhalogenated anthraquinone intermediate having additional halogen atoms in other β-positions besides the 2-position of the anthraquinone nucleus to prepare the invention dyestuffs consisting of the corresponding mono-, di- or trihalogenated anthraquinone, this may be done by adjusting the reaction conditions so that the substitution takes place at only the 2-position.

While the reaction can be carried out in the presence, say, of chlorobenzene or dichlorobenzene, it is usually carried out by using in excess the hydroxyl or amino compounds, which are the reactants. After completion of the reaction, the resulting dyestuff is isolated from the reaction mixture by customary procedures such as washing with methanol, steam distillation and washing with a dilute alkali or dilute mineral acid.

It is an advantage in the present invention for the aforesaid polyhalogenated tetrahydroxyanthroquinone to be a mixture of a chloro-substituted derivative and a bromo-substituted derivative. The reason is that a mixture such as this can be prepared more easily than the individual compounds substituted by a single halogen. Furthermore, the dyeing effects of the dyestuff derived from this mixture by the hereinbefore-described procedure are greater than that of the dyestuffs substituted by the single halogens separately. Thus, when leuco-tetrahydroxyanthraquinone is suspended in a solvent such as chlorobenzene or trichloroethylene and, after adding dropwise at a suitable temperature a mixture of sulfuryl chloride and bromine, heating is continued, oxidation as well as chlorination and bromination take place simultaneously and a mixture of dibromo- and dichlorotetrahydroxyanthraquinone or bromo-chlorotetrahydroxyanthraquinone is obtained relatively easily. When this mixture is monoetherized or monoiminated, a mixture of a chloro-derivative and bromo-derivative is formed. It was confirmed that the affinity of this mixture to metal-modified polyolefin fibers was even better than that of the single product. Depending upon the halogenation conditions of the aforesaid leuco compound, a mixture of halogeno-compounds containing tetrahalogeno compounds is formed from the reaction. Hence, it is also possible to obtain the dyestuffs of this invention comprising a mixture of polyhalogenated tetrahydroxyanthraquinone derivatives by etherizing or imination of the foregoing mixture of polyhalogenocompounds. Generally speaking however, a monohalide containing a small amount of dihalides is better.

According to this invention, the dyeing is carried out by bringing an effective amount of the aforesaid dyestuff into contact with a metal-modified polyolefin fiber in an aqueous suspension. In advance of the use of the dye, conveniently the dye is given a so-called comminution treatment by a suitable method consisting, for example, of dissolving the dye in 90–93% sulfuric acid at a low temperature, discharging into ice water, followed by filtering and washing to obtain a cake which is ground together with a cationic or anionic dispersing agent.

Now, when the dyestuffs prepared by the foregoing process are indicated in Table I, below, for convenience' sake by means of their starting anthraquinone intermediates and the aforesaid condensation materials represented by the formula HY, the hue obtained when metal-modified polypropylene fibers were dyed by these dyes are as shown in said table.

TABLE I

| Starting anthraquinone intermediate | Condensation material | Hue of products dyed with the resulting dyes nickel-modified | Aluminum-modified |
|---|---|---|---|
| 2-bromoquinizarin | o-Cresol | Brilliant red | Brilliant red. |
| Do | p-t-Butylphenol | Red | Red. |
| Do | p-t-Hexylphenol | Red | Red. |
| Do | p-Isooctylphenol | Red | Red. |
| Do | p-Isononylphenol | Red | Red. |
| Do | 2-Ethylhexanol | Red-purple | Red-purple. |
| Do | Aniline | Purple | Purple. |
| Do | o-Toluidine | do | Do. |
| Do | m-Toluidine | Brilliant purple. | Brilliant purple. |
| Do | p-Toluidine | Purple | Purple. |
| Do | p-Chloroaniline | do | Do. |
| Do | m-Chloroaniline | do | Do. |
| Do | o-Chloroaniline | do | Do. |
| Do | p-Isopropylaniline. | Red-purple | Red-purple. |
| Do | p-Butylaniline | do | Do. |
| Do | p-t-Amylaniline | Purple | Purple. |
| Do | N-methylaniline | do | Do. |
| Do | N-ethylaniline | do | Do. |
| Do | 2-ethylhexylamine. | Brown | Dark brown. |
| Do | Laurylamine | do | Brown. |
| 2-halogen-1,4,5,8-tetrahydroxyanthraquinone. | o-Cresol | Blue | Blue. |
| Do | p-t-Butylphenol | do | Do. |
| Do | p-t-Hexylphenol | do | Do. |
| Do | p-Isooctylphenol | do | Do. |
| Do | 2-ethylhexanol | do | Do. |
| Do | Aniline | do | Do. |
| Do | o-Toluidine | do | Do. |
| Do | m-Toluidine | do | Do. |
| Do | p-Toluidine | do | Do. |
| Do | m-Xylidine | do | Do. |
| Do | p-Isopropylamine | do | Do. |
| Do | p-t-Amylaniline | Greenish blue | Greenish blue. |
| Do | m-Chloroaniline | Blue | Blue. |
| Do | N-methylaniline | do | Do. |
| Do | N-ethylaniline | do | Do. |
| Do | 2-ethylhexylamine. | Indigo blue | Indigo blue. |
| Di-halogen-1,4,5,8-tetrahydroxyanthraquinone. | Phenol | Brilliant blue | Brilliant blue. |
| Do | o-Cresol | do | Do. |
| Do | p-Cresol | Blue | Blue. |
| Do | Aniline | Greenish blue | Greenish blue. |
| Do | o-Toluidine | do | Do. |
| Do | m-Toluidine | do | Do. |
| Do | p-Toluidine | do | Do. |
| Do | p-t-Amylaniline | do | Do. |
| Do | 2-ethylhexanol | Blue | Blue. |
| Do | 2-ethylhexylamine. | Indigo blue | Indigo blue. |

In consideration of the various points such as the dye intensity and brilliancy, fastness as well as the manufacture of the dyestuffs, those believed to be most valuable commercially of the numerous embodiments of the invention are the dyeing of the aluminum-modified polypropylene fibers red by means of 2-o-methylphenoxyquinizarin, the dyeing of the aluminum- as well as nickel-modified polypropylene fibers purple by means of 2-m-methylanilino-quinizarin, the dyeing of the aluminum- as well as nickel-modified polypropylene fibers red-purple by means of 2-β-ethylhexyloxyquinizarin and the dyeing of alumimum- as well as nickel-modified polypropylene fibers blue by means of 2-phenoxy-6-(or 7)-bromo (or chloro)-1,4,5,8-tetrahydroxyanthraquinone.

The hue of the dyed products obtained by the use of the invention dyestuffs can be varied over a broad range depending upon the variations in the combinations of X, Y and Z and the class of the metal incorporated in the product to be dyed. In general, a compound in which the two X's are hydrogen imparts a hue of the red-purple series to the dyed product and a compound in which the two X's are hydroxyl groups imparts a hue of the blue series to the dyed product. On the other hand, a compound in which the Y contains an imino group imparts a deeper color than that containing oxygen. For example, the 2-phenoxy substitution products of 1,4-dihydroxyanthraquinones dye aluminum-modified polypropylene fibers a brilliant red color but in the case of a 2-anilino substitution product, the fibers are dyed purple. These relationships are shown in Table I.

Slight differences in the lightfastness of the products dyed in accordance with this invention are noted depending upon the structure of the dye, and particularly as to whether it has an ether bond or an imino bond, as well the class of the metal which participates in the chelation. For example, when a comparison is made as to the nickel- and the aluminum-modified fibers, in general, the quinizarin derivatives having the ether bond impart high light fastness to the aluminum-modified fibers, whereas the 1,4,5,8-tetrahydroxyanthraquinone derivatives having the ether bond impart high light fastness to the nickel-modified fibers. It is observed that in the case of the derivatives of both series having the imino bond, high light fastness is exhibited by both when used for dyeing either the aluminum-modified or the nickel-modified fibers.

Fastness to drycleaning and fastness to burning gas, especially nitrogen oxide gas, always becomes a problem in the case of particularly the blue series dyestuffs, but the dyestuffs of this invention are, on the whole, outstanding in respect of both these fastnesses.

The metal-modified polypropylene fibers, which are to be applied as disperse dyes in accordance with this invention, can be obtained by spinning as known in the art a comelt of polypropylene with a metal salt, for example, such as a metal salt of higher aliphatic acids or a metal salt of phenols, followed by submission to a drawing treatment, if necessary. Of the metals to be used, particularly effective are aluminum, nickel and zinc, the proper content thereof being on the order of 0.1–0.5% by weight based on the fibers.

In dyeing metal-modified polypropylene fibers with the disperse dyes according to this invention, the basic procedure consists of dispersing the aforesaid finely divided dye at a bath ratio of 30–50 times based on the fibers, adjusting the pH to 3–6 in the presence of a suitable anionic or nonionic surfactant, dyeing the fibers for 20–90 minutes at 100–120° C., and thereafter washing the dyed fibers with water, followed by soaping or hydrosulfite cleaning. It is also possible to carry out the dyeing by the so-called thermosol method consisting of padding the aqueous dispersion to which has been added a nonionic surfactant and, after drying, submitting to a dry heat treatment for about 3 minutes at about 130° C.

The following examples are given for illustrating this invention and are not intended to limit the invention in any way whatsoever.

The various colorfastnesses ratings mentioned in the examples have been determined by the standard methods as established by the Japanese Industrial Standard Association, the ratings being indicated by the numbers which represent from 1 to 8 for the light fastness with 8 for the highest, from 1 to 5 for the others with for 5 the highest.

Light fastness: JIS L 1044—1959 (Japanese Industrial Standard Association, Mar. 30, 1959)

Fastness to washing: JIS L 1045—1959 MC-2 (Japanese Industrial Standard Association, Mar. 30, 1959)

Fastness to crocking: JIS L 1048—1959 (Japanese Industrial Standard Association, Mar. 30, 1959)

Fastness to nitrogen oxide gas: JIS L 1055—1961 (Japanese Industrial Standard Association, Dec. 1, 1961)

Fastness to drycleaning: JIS L 0186—1965 (Japanese Industrial Standard Association, Jan. 1, 1965)

EXAMPLE 1

215 grams of o-cresol were heated to 100° C., after which 39 grams of potassium carbonate were added, and the mixture was stirred for one hour. 0.6 gram of copper powder and 500 cc. of o-dichlorobenzene were added to the mixture, followed by the addition thereto of 75 grams of 2-bromoquinizarin powder. The temperature of the mixture was then raised to 150° C. over a period of 2 hours, after which the heating was continued at 150–155° C. until the bromine bond disappeared, which took 18 hours. After completion of the reaction, 220 grams of 10% hydrochloric acid were added to the reaction product and the steam distillation thereof was carried out to distill off the unconverted o-cresol and o-dichlorobenzene, following which the resulting dyestuff was filtered and dried. 77 grams of an orange-brown powder were obtained. This dye, which melted at 140–148° C., had the following chemical structure:

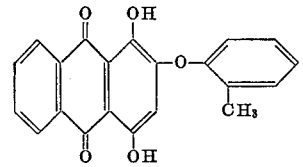

In order to comminute this, it was first dissolved in a 20-fold amount of 92% sulfuric acid at below 10° C., followed by discharging it into 3 liters of ice water, after which the precipitate was filtered and water-washed. After adding 154 grams of sodium dinaphthylmethane sulfonate to the filter cake and pulverizing thoroughly with a colloid mill, the powdered dyestuff was dried.

0.3 gram of the so obtained finely powdered dye was dispersed in 500 cc. of water, to which were added 0.25 gram of a nonionic surfactant prepared from nonyl phenol and ethylene oxide and 0.2 cc. of acetic acid of 6° Bé. to prepare the dye bath. 10 grams of modified polypropylene containing 0.2% by weight of aluminum (basic aluminum stearate was incorporated) were dipped in this dye bath, which was then raised to the boil. The dyeing was carried out for one hour, followed by water-washing of the dyed fibers. The fibers were then heated for 20 minutes at 85° c. in 500 cc. of water in which had been dissolved 0.25 gram of "Monogen" (sulfates of higher alcohol; registered trade name of Daiichi Kogyo Company, Japan), 0.5 gram of caustic soda and 0.5 gram of sodium hydrosulfite, followed by washing with water. The dyed product so obtained exhibited a very brilliant red color, and its light fastnesses was 6, and drycleaning, nitrogen oxide gas, washing and crocking were in all cases a rating of 5. It was also fast to sublimation.

When modified polypropylene fibers containing 0.3% by weight of zinc were dyed in a similar manner, the fibers dyed pink and the light fastness was 6.

EXAMPLE 2

42 grams of 2-bromoquinizarin were added to a mixture of 140 grams of m-toluidine and 150 cc. of o-dichlorobenzene, followed by the addition of 18 grams of potassium carbonate and one gram of copper powder. The temperature of the mixture was then raised to 150° C., taking 2 hours, after which the reaction was carried out for 16 hours at 150–155° C. After completion of the reaction product was treated as in Example 1 to obtain 44 grams of a brown-purple powder of a melting point 182–187° C., having the following formula:

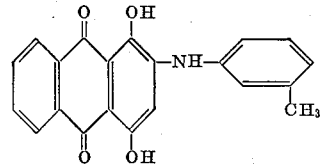

Aluminum-modified polyproylene fibers containing 0.2% by weight of aluminum and nickel-modified polypropylene fibers containing 0.3% by weight of nickel were dyed as in Example 1, using the foregoing dye. The alumininum-modified polypropylene fibers were dyed a brilliant purple color, whose light fastness was 6, while fastnesses to washing, drycleaning, crocking and nitrogen oxide gas were in all instances a rating of 5. The nickel-modified polypropylene fibers were dyed a brilliant purple color, whose light fastness was 6–7.

EXAMPLE 3

A mixture of 32 grams of 2-bromoquinizarin, 104 grams of 2-ethylhexanol, 100 cc. of o-dichlorobenzene and 17 grams of potassium carbonate was heated first for 3 hours at 140° C. and then for 6 hours at 155–160° C., after which the reaction product was treated as in Example 1 to yield 31 grams of a dyestuff of the following formula:

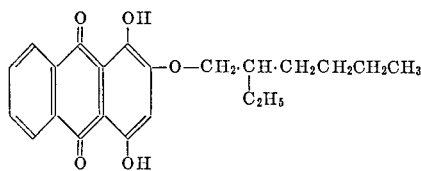

The dispersion bath of this dyestuff dyed the nickel-modified, aluminum-modified and zinc-modified propylene fibers all to a red-purple color by treating as in Example 1. The light fastness was 7–8, 6 and 5, respectively.

EXAMPLE 4

100 grams of leuco-1,4,5,8-tetrahydroxyanthraquinone were suspended in 500 grams of chlorobenzene, to which suspension was then added one gram of iodine, followed by the addition dropwise over a 5-hour period at 75–80° C. of 200 grams of sulfuryl chloride and then the continuance of the heating for 3 hours at 80° C. Next, after having distilled off the chlorobenzene by means of steam distillation, the reaction product was filtered and dried to obtain 120 grams (chlorine content 19.7%) of 2,6-dichloro-1,4,5,8-tetrahydroxyanthraquinone.

Fifty grams of the foregoing compound was introduced at 110° C. to a mixture of 250 grams of phenol and 35 grams of potassium carbonate and heated for 18 hours at 155–165° C. After cooling this reaction product to 60° C., 250 cc. of methanol were added thereto, after which the reaction product was filtered at room temperature, washed with methanol, washed with water and then with dilute hydrochloric acid solution, again washed with water and dried, thereby obtaining 52 grams (chlorine content 8.2%) of a dyestuff having the following formula:

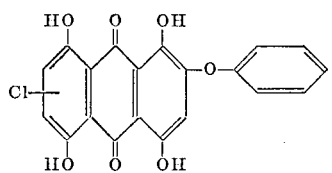

Using this dye and operating as in Example 1, aluminum-modified and nickel-modified fibers were dyed. In both cases, products which were dyed a brilliant blue color were obtained. The light fastness of these dyed products was 5 and 7–8, respectively.

EXAMPLE 5

100 grams of 1,4,5,8-tetrahydroxyanthraquinone were suspended in 400 grams of nitrobenzene, to which was then added one gram of iodine. After adding 140 grams of bromine to this suspension at 80–90° C., taking 3 hours to complete this addition, the temperature was raised to 145–150° C. within 3 hours, the heating at this temperature being continued for an additional 6 hours. After completion of the reaction, the nitrobenzene was eliminated from the reaction mixture by means of steam distillation, followed by filtering and drying the reaction product to yield 150 grams of dibromotetrahydroxyanthraquinone. Using this as the starting material, the phenoxidation reaction was carried out as in Example 4, and a compound of the following formula was obtained:

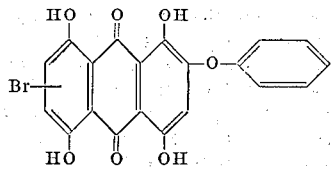

Using the so obtained compound and operating as in Example 4, aluminum-modified and nickel-modified polypropylene fibers were dyed with results substantially the same as obtained in Example 4. The light fastness was 5 and 7–8, respectively.

EXAMPLE 6

100 grams of leuco-1,4,5,8-tetrahydroxyanthraquinone were suspended in 500 grams of chlorobenzene, to which suspension were added 1.1 grams of iodine. After adding dropwise a mixture of 150 grams of sulfuryl chloride and 95 grams of bromine at 80° C., taking 5 hours to complete the addition, the heating was continued for an additional 3 hours at 80° C. Then, the chlorobenzene was distilled off by means of steam distillation, followed by filtering and drying the reaction product. The product was a mixture of polychloro- and polybromotetrahydroxyanthraquinone (bromine content 19.00%, chlorine content 10.61%), the yield being 130 grams.

Fifty grams of the foregoing halide mixture were introduced at 110° C. into a mixture of 250 grams of phenol and 35 grams of potassium carbonate, which was then heated for 18 hours, at 165–170° C. After cooling this reaction mixture to 60° C., 250 cc. of methanol were added, followed by filtration of the mixture at room temperature, washing with methanol, washing with dilute hydrochloric acid solution, again washing with water and drying. Thus were obtained 52 grams of a dyestuff mixture (Cl content 5.60%, Br content 9.47%) consisting predominantly of the two compounds having the following structures:

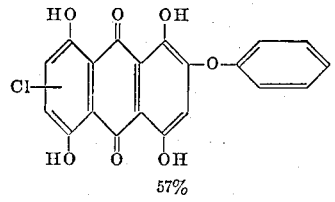
57%

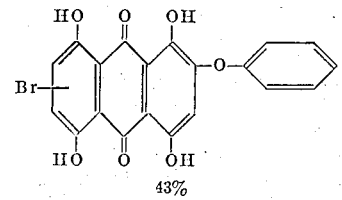
43%

Following the procedures described in Example 1, fine powders of these compounds were prepared, which were then used in dyeing aluminum-modified and nickel-modified polypropylene fibers. Intense and brilliant blue dyeings were obtained with both compounds. The light fastness, washing, drycleaning, crocking and nitrogen oxide gas was 5 in all instances in the case of the dyed product of the aluminum-modified polypropylene fibers, while the light fastness of the dyed product of the nickel-modified polypropylene fibers was 7–8.

EXAMPLE 7

Fifty grams of the mixture of polychloro- and polybromo - 1,4,5,8 - tetrahydroxyanthraquinone prepared in Example 6 were heated for 6 hours at 130–140° C. along with 250 grams of aniline and 35 grams of potassium carbonate. Then by operating as in Example 6, a mixture consisting predominantly of the two compounds having the following structure were obtained:

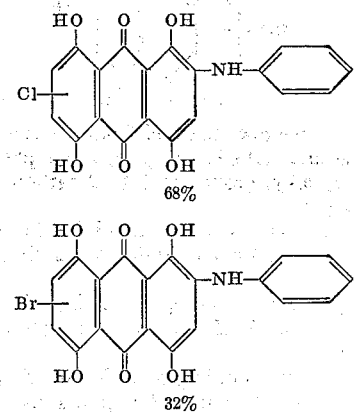

Aluminum-modified and nickel-modified polypropylene fibers were dyed as in Example 1, with the consequence that both were dyed a blue color somewhat more tinged with green. The light fastness was 6 and 7–8, respectively.

EXAMPLE 8

100 grams of 1,4,5,8-tetrahydroxyanthraquinone were mixed with 350 grams of nitrobenzene, to which mixture were then added 80 grams of bromine, taking about 3 hours at 80–100° C. to complete the addition. The mixture was then heated for 10 hours at 120° C., following which the nitrobenzene was eliminated by steam distillation to obtain 2-bromo-tetrahydroxyanthraquinone containing 26.68% bromine.

Then by anilinizing as in Example 7 a dyestuff corresponding to the following formula was obtained.

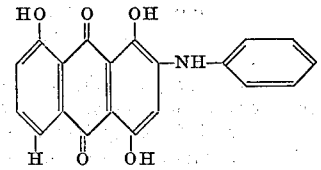

When aluminum-modified and nickel-modified polypropylene fibers were dyed as in Example 1, blue dyeings were obtained in both cases which were slightly inferior to those of Example 7. The light fastness was 5–6 and 7, respectively.

EXAMPLE 9

Fifty grams of 2-bromoquinizarin were added at 100° C. to a mixture of 200 grams of p-t-hexylphenol and 35 grams of potassium carbonate, and the mixture was heated for 15 hours at 160–170° C. This was followed by cooling the reaction mixture to 60° C., adding 200 cc. of methanol, filtering at room temperature, washing with methanol and thereafter washing with water to obtain a dyestuff having the following formula:

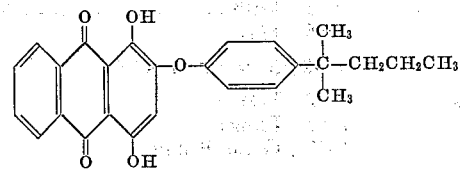

When aluminum-modified polypropylene fibers were dyed by operating as in Example 1, fast, brilliant red dyeings were obtained, whose light fastness was 5–6.

EXAMPLE 10

By operating as in Example 2, except that instead of m-toluidine an equal quantity of p-isopropylaniline was used, a dyestuff of the following formula was obtained:

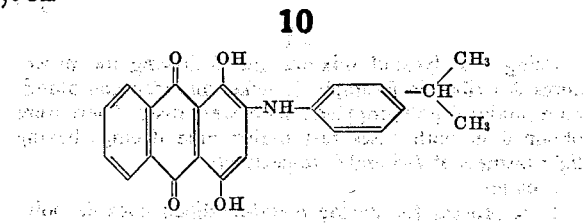

Aluminum-modified and nickel-modified polypropylene fibers were dyed by operating as in Example 1, with the consequence that in both cases fast, red-purple dyeings were obtained, whose light fastness was 5 and 7, respectively.

EXAMPLE 11

Except that instead of phenol an equal quantity of p-t-butylphenol was used, the procedure described in Example 6 was otherwise followed to obtain a mixture consisting predominantly of the two compounds having the following structures:

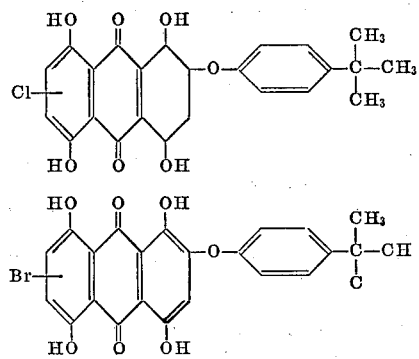

By operating as in Example 1, this dyestuff dyed both aluminum-modified and nickel-modified polypropylene fibers a fast blue color, whose light fastness was 4 and 7, respectively.

EXAMPLE 12

Example 8 was repeated except that instead of aniline an equal quantity of N-butylaniline was used to obtain a dyestuff of the following formula:

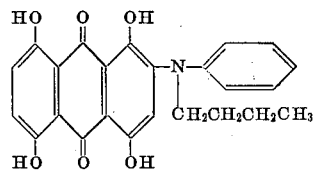

Using this dye and following the procedures described in Example 1, nickel-modified polypropylene fibers were dyed. A fast blue dyeing was obtained, the light fastness of which was 7.

EXAMPLE 13

A mixture consisting predominantly of the two compounds having the following structures was obtained by using instead of the aniline in Example 7 an equal quantity of 2-ethylhexylamine:

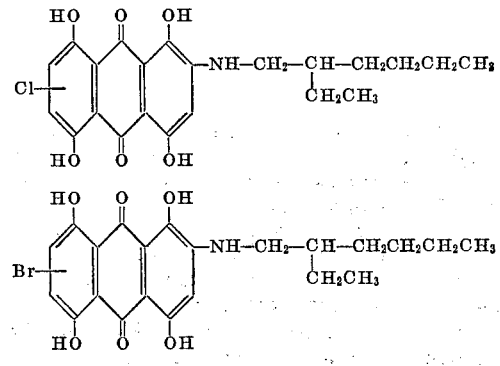

Using this dyestuff mixture and following the procedures described in Example 1, nickel-modified and aluminum-modified polypropylene fibers were dyed. There were obtained in both cases fast indigo blue dyeings having light fastness of 7-8 and 6, respectively.

I claim:
1. A process for dyeing metal-modified dyeable polyolefin fibers which comprises contacting said fibers with an aqueous dispersion of an anthraquinone dye having the following formula

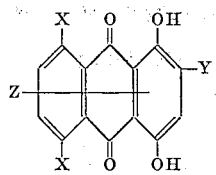

wherein X is a member selected from the class conisting of hydrogen and a hydroxyl group, Y is a member selected from the class consisting of OR, NHR and

R is a phenyl group, which phenyl group may be substituted by a member selected from the class consisting of halogens and alkyl groups of 1 to 9 carbon atoms, R' is an alkyl group of 1 to 4 carbon atoms and Z is a member selected from the group consisting of hydrogen and halogens, but Z being limited to only the halogens when Y is a member selected from the class consisting of alkoxy groups of 1 to 6 carbon atoms, alkyl amino groups, phenoxy group and phenoxy groups which are substituted by a methyl or ethyl group in the meta or para position.

2. The process according to claim 1 wherein said metal-modified polyolefin fibers are those modified by a metal selected from the group consisting of aluminum, nickel and zinc.

3. The process according to claim 2 wherein 2-o-methylphenoxyquinizarin is used as the dye.

4. The process according to claim 2 wherein is used an anthraquinone dye of the formula

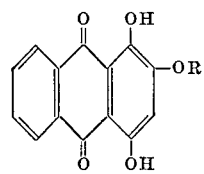

wherein R is a member selected from the class consisting of alkyl groups of 7 to 12 carbon atoms and phenyl groups substituted by alkyl groups of 3 to 9 carbon atoms.

5. The process according to claim 4 wherein 2-p-isohexylphenoxyquinizarin is used as the dye.

6. The process according to claim 2 wherein is used an anthraquinone dye of the formula

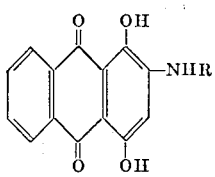

wherein R is a member selected from the class consisting of alkyl groups of 1 to 12 carbon atoms, phenyl group, halophenyl groups and phenyl groups substituted by alkyl groups of 1 to 9 carbon atoms.

7. The process according to claim 6 wherein 2-m-methylanilinoquinizarin is used as the dye.

8. The process according to claim 6 wherein 2-o-chloroanilinoquinizarin is used as the dye.

9. The process according to claim 6 wherein 2-p-isopropylanilino-quinizarin is used as the dye.

10. The process according to claim 2 wherein is used an anthraquinone dye of the formula

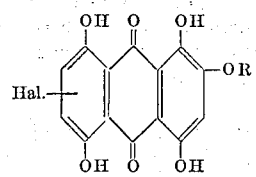

wherein R is a member selected from the class consisting of phenyl group, halophenyl groups and phenyl groups substituted by alkyl groups of 1 to 9 carbon atoms, and Hal. is a halogen.

11. The process according to claim 10 wherein 2-phenoxy - 6 - chloro-1,4,5,8-tetrahydroxyanthraquinone is used as the dye.

12. The process according to claim 10 wherein 2-phenoxy - 6 - bromo-1,4,5,8-tetrahydroxyanthraquinone is used as the dye.

13. The process according to claim 10 wherein a mixture of 2-phenoxy - 6 - chloro-1,4,5,8-tetrahydroxyanthraquinone and 2-phenoxy - 6 - bromo-1,4,5,8-tetrahydroxyanthraquinone is used as the dye.

14. The process according to claim 2 wherein is used an anthraquinone dye of the formula

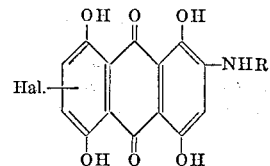

wherein R is a member selected from the class consisting of alkyl groups of 1 to 12 carbon atoms, phenyl group, halophenyl groups and phenyl groups substituted by alkyl groups of 1 to 9 carbon atoms, and Hal. is a halogen.

15. The process according to claim 14 wherein a mixture of 2 - anilino - 6 - chloro-1,4,5,8-tetrahydroxyanthraquinone and 2-anilino - 6 - bromo - 1,4,5,8 - tetrahydroxyanthraquinone is used as the dye.

16. The process according to claim 14 wherein a mixture of 2-β-ethyl-hexylamino - 6 - chloro - 1,4,5,8-tetrahydroxyanthraquinone and 2-β-ethyl-hexylamino-6-bromo-1,4,5,8-tetrahydroxy-anthraquinone is used as the dye.

17. The process according to claim 2 wherein a mixture of 2-p-tert.-butylphenoxy-6-chloro-quinizarin and 2-p-tert.-butylphenoxy-6-bromo-quinizarin is used as the dye.

18. The process according to claim 2 wherein 2 N-n-butylanilino-1,4,5,8-tetrahydroxyanthraquinone is used as the dye.

19. The process according to claim 2 wherein 2-anilino-1,4,5,8-tetrahydroxyanthraquinone is used as the dye.

References Cited

UNITED STATES PATENTS

| | | | |
|---|---|---|---|
| 2,984,634 | 5/1961 | Caldwell et al. | 260—23 |
| 3,164,438 | 1/1965 | Thomas | 8—46 |
| 3,203,752 | 8/1965 | Mills | 8—75 |
| 3,238,189 | 3/1966 | May. | |

FOREIGN PATENTS

| | | |
|---|---|---|
| 1,306,040 | 9/1962 | France. |
| 1,371,626 | 1963 | France. |
| 777,377 | 6/1957 | Great Britain. |

OTHER REFERENCES

Review of Textile Progress, vol. 14, pp. 291–292, 1962, Pub. by the Textile Institute, Liverpool, England, TS 1300 R 4.

NORMAN G. TORCHIN, *Primary Examiner.*

DONALD LEVY, *Assistant Examiner.*